Patented Mar. 30, 1943

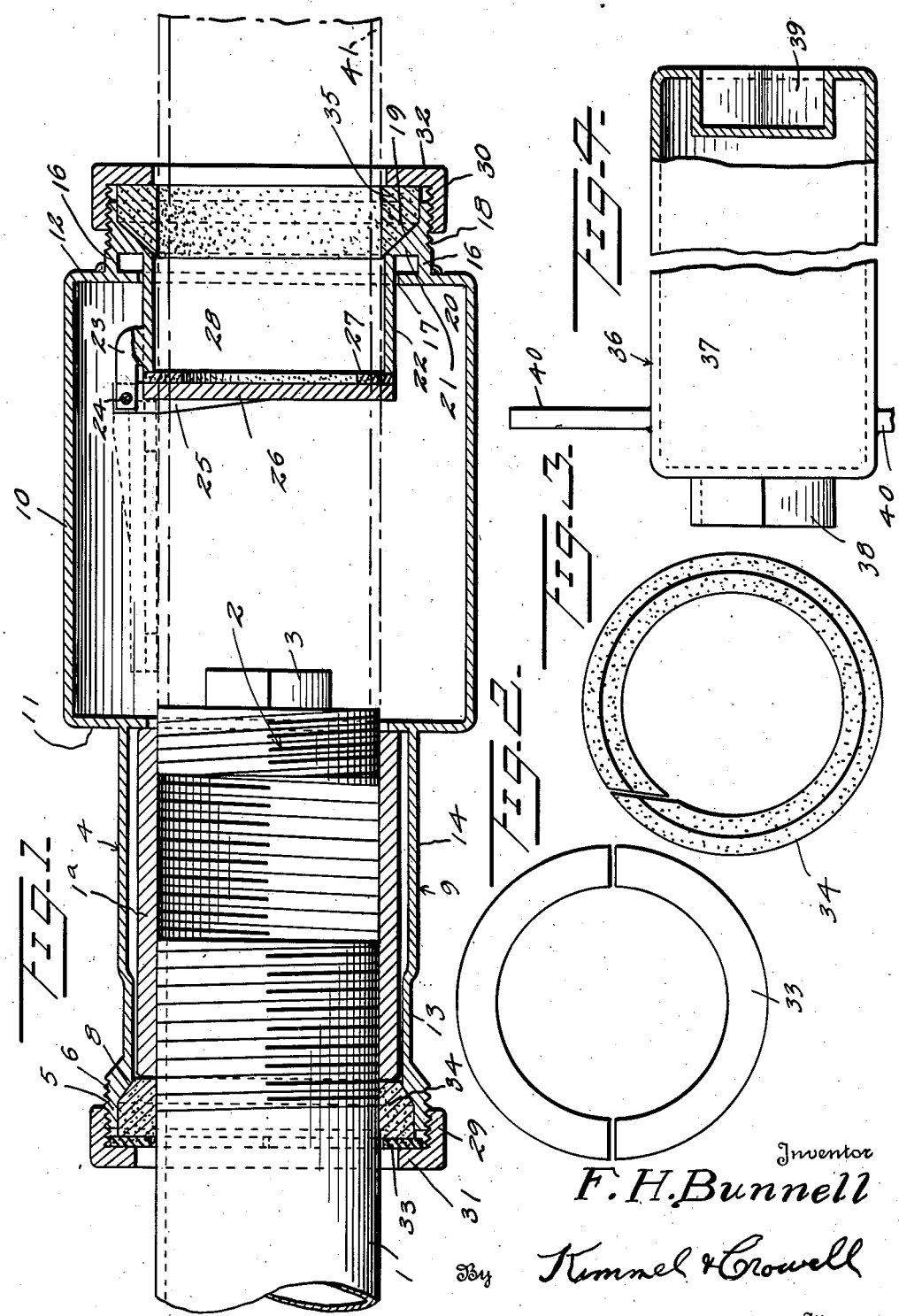

2,314,921

UNITED STATES PATENT OFFICE 2,314,921

PRESSURE RETAINING DEVICE

Fred H. Bunnell, Lansing, Mich.

Application January 31, 1941, Serial No. 376,915

1 Claim. (Cl. 29—84)

This invention relates to a pressure retaining device designed primarily for use when coupling pipes together while under pressure and in service to thereby provide for extension of a main or service pipe for gas or other fluid, and/or for drilling operations under pressure.

The invention aims to provide, in a manner as hereinafter set forth, a means for conveniently connecting an extension to a main or service line without completely shutting down the latter and without the loss of pressure to any material extent.

The invention further aims to provide, in a manner as hereinafter set forth, a device of the class referred to, constructed in a manner for the retaining of pressure from a main or service line during the operation of connecting together pipe sections of the main or service line or adding an extension to the line, and/or drilling when desired.

The invention further aims to provide, in a manner as hereinafter set forth, a structure that will permit of making a joint in a service line inside of a pressure retainer.

The invention further aims in the provision of means for making it possible for the conventional screwed connection of pipes, while in service, including the removal of the plug in the end of the line to be extended, and the screwing in or threading in of the next length or lengths to be extended or added without material loss of pressure from a service line, and/or drilling through end of pipe to be extended where necessary.

Further objects of the invention are to provide a pressure-retaining device which is simple in its construction and arrangement, strong, durable, thoroughly efficient in its use, expeditiously arranged relative to a pressure line which is to be extended, readily assembled and comparatively inexpensive to manufacture.

Embodying the aims aforesaid and others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a longitudinal sectional view of a pressure retaining device, in accordance with this invention, showing the adaptation thereof with respect to a main or service line which is to be extended, Figure 2 is an elevation illustrating the split washer forming an element of the device, Figure 3 is an elevation of a split gasket forming an element of the device, and Figure 4 is a side elevation, broken away and partly in lengthwise section, of a wrench forming an element of the device.

With reference to the drawing, I indicates a pipe forming a part of a line, not shown, which is closed by a sleeve-like coupling $1a$ carrying a removable threaded plug 2. The outer end of the plug 2 is formed with a reduced squared lug 3.

A pressure retaining device, in accordance with this invention, includes a tubular element or sleeve, generally indicated at 4. The latter constitutes a guide, for a purpose to be referred to, and also correlates with parts to be referred to and with the coupling $1a$ to provide a pressure retaining chamber. The element 4 has its major portion of greater diameter than the coupling $1a$. The element 4 inner end annular portion 5 formed with peripheral threads 6 and having its inner face formed with a part 7 of uniform diameter and a part 8 of gradually decreasing diameter. The element 4 includes an inner annular intermediate portion 9 and an outer annular intermediate portion 10 of greater diameter than the portion 9. The portion 10 at its inner end is formed with an inwardly extending annular flange 11 and at its outer end with an inwardly extending annular flange 12. The portion 9 in connection with the flanges 11 and 12 provide a chamber having annular end walls, and such chamber is for the passage of the extension. The portion 9 has an inner part 13 which is inset with respect to the end part 5. The portion 9 has an outer part 14 which is outset with respect to the portion 13. The portion 14 merges into the flange 11 outwardly of the inner edge 15 of such flange.

The element 4 includes an outer end part 16 in the form of a collar which is integral with and welded to the outer face of the flange 12 outwardly with respect to the inner edge 17 of the flange 12. The collar 16 has peripheral threads 18. The inner face of collar 16 has a portion 19 of uniform diameter and a portion 20 of gradually decreasing diameter. That part of the collar 16 which forms the portion of gradually decreasing diameter is indicated at 21 and is spaced from the outer face of the flange 12. Formed integral with the portion 20 and extending into the portion 10 through the flange 12 is a sleeve 22, which constitutes a combined valve carrier and valve seat for a purpose to be referred to. The diameter of the sleeve 22 is greater than the pipe 1. This statement also applies to the plug 2. The sleeve 22 is of materially less length than the length of the portion 10 of the element 4. Fixed to the top of the sleeve 22 and extending rearwardly therefrom is a supporting means 23 for a purpose to be referred to. The portions designated 5, 13, 14 are integral with each other and constitute a reduced tubular inner end part for element 4. The portions 10, 11, 12 are integral with each other and constitute an enlarged tubular intermediate part for the element 4, and the part 16 constitutes a reduced tubular outer end part for said element 4. The flange 11 which forms the inner wall of the pressure retaining chamber opposes the outer end of the coupling 1a. The inner diameter of the sleeve or tubular member 22 corresponds substantially to the inner diameter of the coupling 1a. The aforesaid parts are coaxially arranged.

Pivotally connected to the means 23, as at 24, is a carrier 25 to which is fixedly secured a normally seated gravity closable check valve 26. The carrier 25 is secured to the rear face of the valve 26. Secured against the front face of valve 26 is an annular gasket or packing 27 for correlation with a valve seat 28 formed by the inner end edge of the sleeve 22. The normal position of the valve 26 is as shown in full lines in Figure 1 and when shifted from normal position, it is to assume the dotted line position shown in Figure 1.

The device includes a pair of oppositely disposed internally threaded flange rings 29, 30 having their flanges indicated at 31, 32 respectively. The ring 29 is for correlation with the inner end portion 5 of the element 4. The ring 30 is for correlation with the collar 16 at the outer end of the element 4. The device includes a split washer 33 and a split bevelled resilient gasket 34, the former for correlation with the ring 29 and the latter for correlation with the inner end portion 5 of the element 4. The device includes a solid resilient gasket 35 for correlation with the ring 30 and collar 16. The inner diameter of the gasket 35 is slightly less than the inner diameters of the sleeve 22, collar 16 and flange 32.

The device includes a wrench indicated at 36 formed of a closed hollow body portion 37 formed at one end with a hollow extension 38 and at its other end with an internal recess 39, both of which correspond in contour to that of lug 3. The body portion 37 corresponds in diameter to that of the pipe. The extension 38 and recess 39 are for selectively engaging the lug 3 whereby when the wrench 36 is revolved it will remove the plug 2 from the coupling. The wrench 36 has handle members 40. The pipe for connection to the line is indicated at 41.

With respect to the operation of the device, the ring 29 is slipped over the pipe 1, coupling 1a and the washer 33 fits in the recess formed by the ring 31. The washer is to closely fit the pipe. The gasket 34 is arranged about the pipe and within the end portion 5 of the element 4. The latter is arranged to extend about coupling 1a and with the flange 11 abutting the coupling as shown in Figure 1 to limit the extent of element 4 about the pipe and coupling. By screwing the ring 29 on the end part 5 of element 4 it forces the gasket 34 against the end of the pipe coupling and a gas tight joint is made. The ring 30 is to fit over the pipe to be extended or rather coupled up, as well as the gasket 35, but before the line is extended by a pipe section, the wrench 36 is inserted to remove the pipe plug in the end of the coupling. When the wrench is inserted, the check valve 26 is moved to the dotted line or open position. As the plug 2 is withdrawn, the check valve prevents the escape of the contents and while the check valve is open at any time, a slight tension on gasket 35, which has been lubricated with any suitable means, retains the pressure and at the same allows the wrench handle to slip freely enough to remove the plug. After removal of the plug the check valve is in closed position and the pipe section is inserted through ring 30 and just enough pressure is exerted on gasket 35 to retain the internal pressure before pushing past the check valve 26. The ring 30 and sleeve 22 acts as guides when entering the pipe section into the coupling and the joint is made tight.

After the pipe section has been secured to the pipe coupling, the device itself, except the split washer and split gasket, is abandoned, or may be left secured to act as a joint reinforcement.

It will be readily seen that when the device is used, the element 4 at one end is slipped over a coupling and a plug which terminates a pipe line making a fluid tight joint, after which the pipe plug is removed without loss of gas or fluid pressure. This is done by means of the wrench which is of the same diameter as the pipe and the gasket in the other end of the element 4 between the body and wrench. When the wrench is extended into the body and moves the check valve to an open position, the seal about the wrench will prevent loss of gas or fluid past the wrench. Upon withdrawal of the wrench with the plug carried in the socket thereof the check valve will move a closed position before the wrench is completely withdrawn, due to the length of the guide sleeve. After the removal of the pipe plug the length or lengths of the pipe to be added to the end of the coupling are entered through the gasket 35 and sufficient pressure is again exerted on the gasket by the ring 30 to prevent leakage of the fluid and then the pipe may be pushed through the check valve and engaged in the end of the pipe coupling and the joint is made tight. The gasket 35 and the check valve opening or sleeve 22 act as a guide for entering the wrench and pipes.

This device enables the operator to drill against pressure, i. e., where a pipe is welded or fastened to the side of another pipe under pressure so that the extension is lateral or at an angle to said pipe under pressure, it is possible by placing a coupling without a plug, on the end of the pipe to be extended, to drill through the wall of the pipe under pressure, by mounting the drilling machine on threaded end in place of end ring 30. The drill pushes open the check upon entering and the check drops shut as the drill is removed. In other words, the device is used the same, except a hole is drilled instead of a plug removed.

It is common practice to weld a nipple on the side of a main, drill through the nipple into the side wall of the main and proceed with the extension. By using a nipple or very short piece of pipe, the length of the drill is held to a minimum. The device will permit this to be done under pressure.

What I claim is:

A pressure retaining and coupling device for connecting an extension pipe onto an end of a service line having a cylindrical coupling mounted thereon and a plug threaded into the coupling; said device comprising a hollow body having front and rear walls each formed with an axial opening, the opening in said rear wall being less than the outer diameter of said coupling and greater than the outer diameter of said plug whereby said rear wall is adapted to abut against the outer end of said coupling, a sleeve fixed to said rear wall and loosely engageable about said coupling, an enlarged rear end carried by said sleeve and provided with outer threads, a flanged clamping member threaded onto said rear end of said sleeve, a compressible sealing member engageable within said rear end and compressible by said clamping member about said service line rearwardly of said coupling, a tubular member extending inwardly of said front wall coaxial with said sleeve, and an outwardly closing check valve carried by the inner end of said tubular member.

FRED H. BUNNELL.